Sept. 25, 1951     M. E. COLLINS     2,568,790
FILM REEL DRIVE AND HOLDBACK MECHANISM
Filed June 2, 1945     2 Sheets-Sheet 1
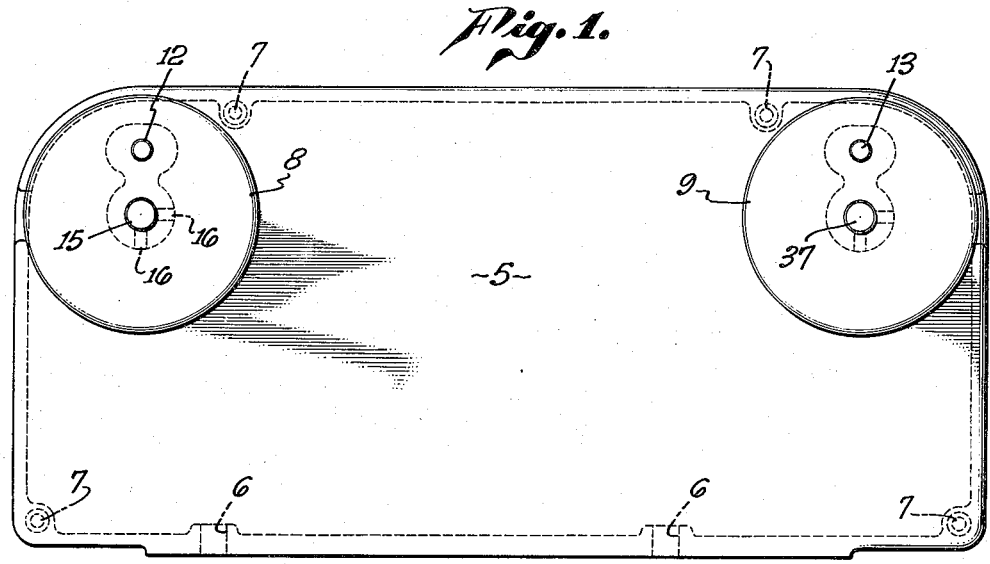
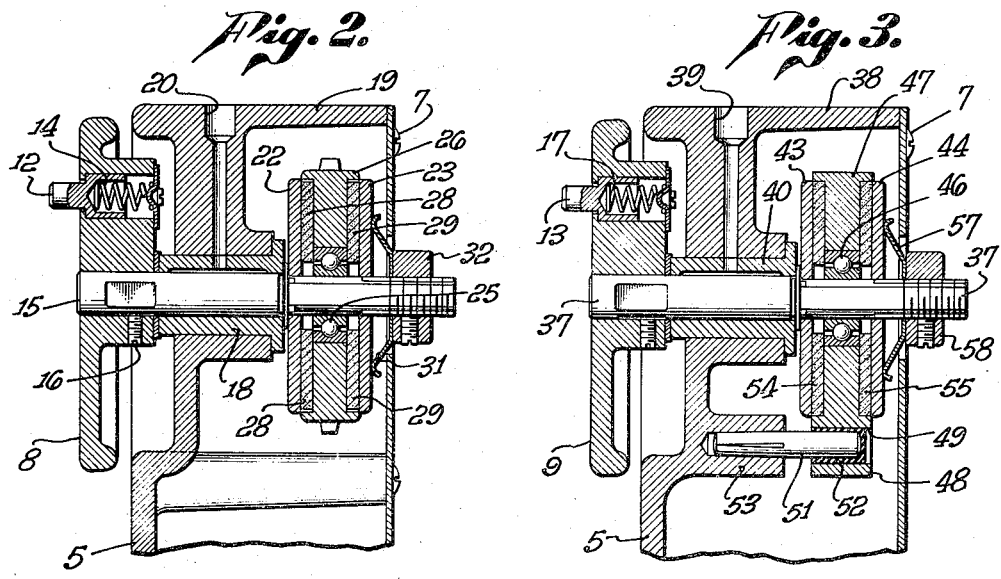
MILFORD E. COLLINS
        INVENTOR.
BY
        ATTORNEY.

Sept. 25, 1951 M. E. COLLINS 2,568,790
FILM REEL DRIVE AND HOLDBACK MECHANISM
Filed June 2, 1945 2 Sheets-Sheet 2
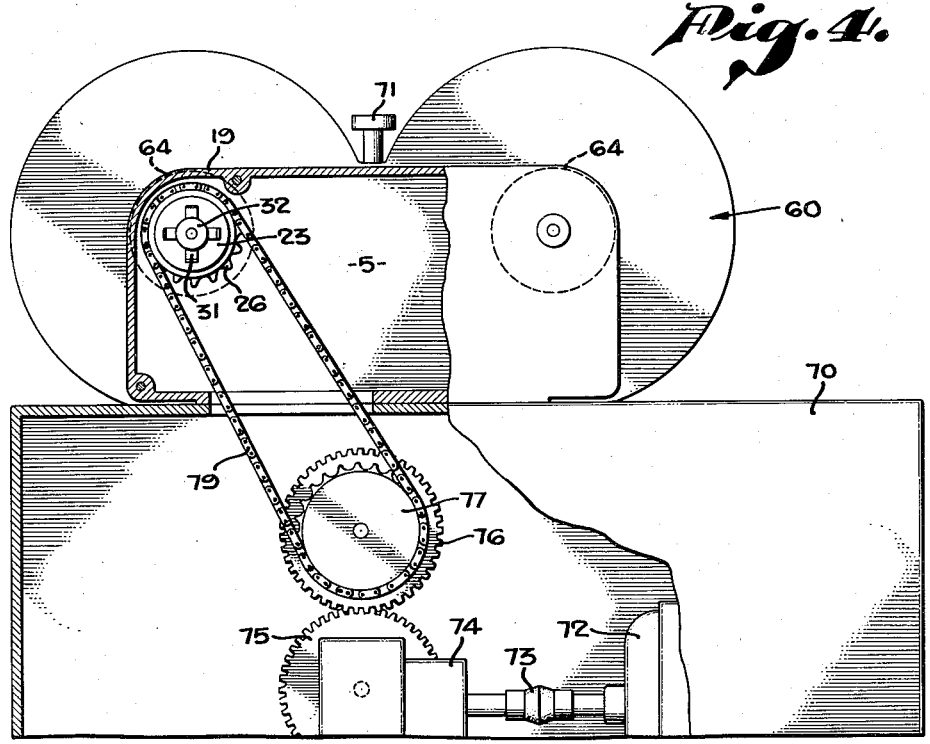
Fig. 4.
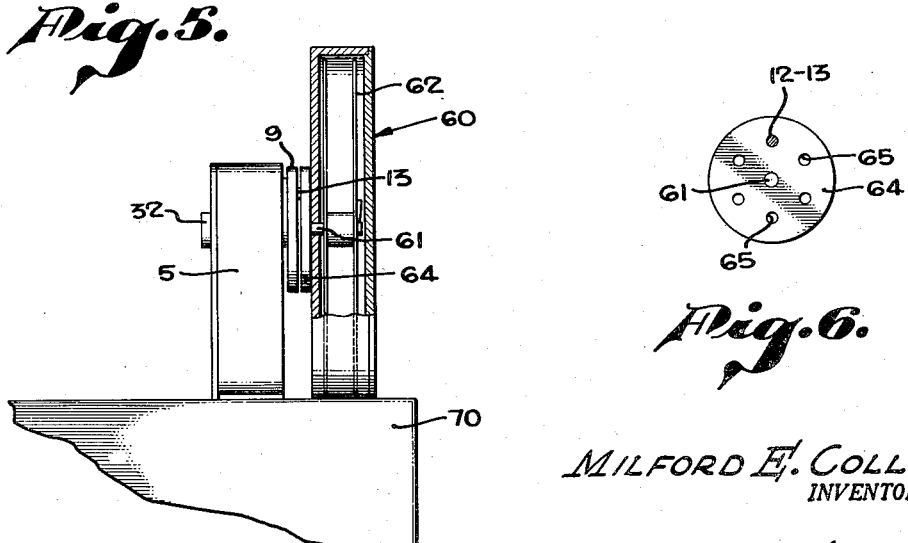
Fig. 5.
Fig. 6.
MILFORD E. COLLINS,
INVENTOR.
BY
ATTORNEY.

Patented Sept. 25, 1951

2,568,790

UNITED STATES PATENT OFFICE 2,568,790

FILM REEL DRIVE AND HOLDBACK MECHANISM

Milford E. Collins, Los Angeles, Calif., assignor to Radio Corporation of America, a corporation of Delaware Application June 2, 1945, Serial No. 597,277

3 Claims. (Cl. 242—55)

1

This invention relates to motion picture film apparatus, and particularly to film reel drive and holdback mechanisms used with motion picture cameras and sound recorders.

The use of film magazines with commercial motion picture cameras and sound recorders is well-known. A loaded magazine includes a reel of unexposed film and a take up reel which are placed in the light-tight magazine in a dark room with the film threaded through a light trap in the magazine to provide an outside loop, the end of the film being attached to the take-up reel. The magazine is then placed on a camera or sound recorder, and the loop threaded through the necessary sprockets thereof past the light impression point for picture and/or sound images. With such a mechanism, it is desirable that the magazine be quickly attachable and detachable to the camera or sound recorder, which is a feature of the present invention.

It is realized that as the film is advanced from the supply reel to the take-up reel, the speed of each reel varies in angular velocity, since the film is advanced at a constant linear speed. To provide for this changing angular velocity, a slipping clutch or belt arrangement has been employed in the past for the take-up reel, the supply reel being permitted to rotate freely.

In sound recorders where one of the critical factors is the maintenance of a constant linear speed of the film at the light exposing aperture, all sources of speed irregularities are to be avoided. Heretofore, one of the sources of such irregularities was the film jerks originating from the supply reel. These jerks are introduced by the supply reel turning too rapidly at intervals, then stopping, and then accelerating again when the film slack is taken up. One of the features of the present invention is the provision of a drag upon the supply reel so that a steady, continuous pull is required to unwind the film. Since the angular velocity or speed of the supply reel varies as the film is taken therefrom, as in the case of the take-up reel, the mechanism for accomplishing a speed variation while a drag is applied to the supply reel is similar to the mechanism for permitting the take-up reel to vary in angular speed as a film is wound thereon, both mechanisms being independently adjustable as to the amount of torque imparted to the respective clutch mechanism.

The present invention is an improvement over the film reel drive mechanism disclosed and claimed in my Patent No. 2,224,899 of December 17, 1940, which provided solely for a take-up reel clutch drive.

The principal object of the invention, therefore, is to facilitate the attachment and detachment of a film magazine to a film camera or recorder.

Another object of the invention is to provide an improved means of driving a film take-up reel and of controlling the speed of rotation of a film supply reel.

A further object of the invention is to provide an improved mechanism for maintaining a drag upon the supply reel of an attachable and detachable film magazine.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a front view of the casing supporting the respective drive and holdback mechanisms of the invention.

Fig. 2 is a cross sectional view of the drive mechanism.

Fig. 3 is a cross sectional view of the supply reel holdback mechanism.

Fig. 4 is an elevational view of the reel drive mechanism in combination with a film magazine and recorder drive mechanism.

Fig. 5 is an end view of the invention in combination with a film magazine, and

Fig. 6 is an elevational view of the magazine reel spindle wheel.

Referring now to Fig. 1, a rectangular mounting casting 5 is adapted to be mounted upon the top of a camera or recorder, particularly a sound film recorder, by bolts through holes 6. A driving disc 8, shown in cross section in Fig. 2, and a holdback disc 9, shown in cross section in Fig. 3, are positioned in the upper left and right-hand corners, respectively, of the casting 5. The disc 8 has a depressible pin 12 urged outwardly by a spring 14, and the disc 9 has a similar depressible pin 13 urged outwardly by a spring 17, the pins being adapted to enter holes in the wheels of the reel shafts of the film magazine, as shown in my above-mentioned patent. The clutches are enclosed in the casting 5 by a cover attached to casting 5 by screws in holes 7.

Referring now specifically to Fig. 2, the disc 8 is fixedly mounted on a shaft 15 by any suitable means, such as set screws 16. The shaft 15 is rotatable in a bearing 18, which is mounted on a bracket 19 of the casting 5 having an oil hole 20 therein. The shaft 15, at its right-hand end, is D-shaped in cross section, and has mounted thereon a pair of friction plates 22 and 23 to rotate therewith. Intermediate the plates 22 and 23 is a ball bearing 25 on which a sprocket wheel 26 is mounted. Intermediate the wheel 26 and the friction drive plates 22 and 23, are two washers 28 and 29, which may be of any suitable material, such as felt or leather, and which serve to provide the proper frictional engagement between the plates 22 and 23 and the sprocket wheel 26. The proper amount of frictional engagement between these elements is determined by the amount of tension in a star spring 31 adjustable by the positioning of a nut 32 on the shaft 15.

Thus, to accommodate the varying diameters of the film roll as the film is wound thereon, and thus, the changing angular speed of the supply reel, slippage is provided between the friction plates 22 and 23 and the sprocket wheel 26, the latter being rotated at a constant speed. This arrangement is similar to that shown in my above-identified patent.

To eliminate irregularities in the film being supplied from the supply reel, the mechanism shown in Fig. 3 is provided, which, as mentioned above, includes the disc 9 with its depressible pin 13 and spring 17, similar to the connecting arrangement for the take-up reel. Also, similar to the mechanism shown in Fig. 2, is a shaft 37, supporting bracket 38, oil hole 39, and a bearing 40. Two friction discs 43 and 44 are also provided, which are fixedly attached to the D end of the shaft 37 intermediate which is mounted a roller bearing 46. Mounted on the bearing 46 is a friction wheel 47 which has an elongated portion 48 having an opening 49 therein. In the opening 49 is one end of a pin 51 covered by a rubber sleeve 52 to prevent noise, the other end of the pin extending into a boss 53 of the bracket mounting 38. Since the boss 53 is stationary, the friction wheel 47 will be maintained stationary, and a drag will be placed on the shaft 37 through the discs 43 and 44 and the friction washers 54 and 55. To control the amount of friction between the discs 43 and 44 and the wheel 47, a star spring 57 is provided together with an adjusting nut 58 similar to spring 31 and nut 32 in Fig. 2.

The two clutches shown in Fig. 2 and in Fig. 3, function similarly, but in opposite directions. That is, in Fig. 2, the friction sprocket wheel 26 is externally driven and the shaft 15 is driven through the friction between the discs 22 and 23 and wheel 26, while in Fig. 3, the shaft 37 is driven by the film being drawn off the supply reel, the drag thereon being determined by the friction between the discs 43 and 44 and the stationary wheel 47. In the latter instance, the film will be held taut between the reel and the first film advancing sprocket, and there will thus be no sudden variations in film pull to be reflected to the sound recording point.

From the above description, it will be noted that it is only necessary to take the loaded film magazine and set it on the recorder so that the reel wheels of the magazine are flush and concentric with the discs 8 and 9. The connections between the discs 8 and 9 and the respective reels are made as soon as either the disc 8 is turned or the supply reel is turned. Since a different amount of torque is required to drive the take-up reel than the torque required for the drag on the supply reel, the proper amounts may be obtained by adjustments of the respective nuts 32 and 58.

To illustrate the relationship between the mechanisms of Figs. 1, 2, and 3 and a film magazine and recorder drive mechanism, reference is made to Figs. 4, 5, and 6, wherein a magazine 60, of any standard type, has therein reel spindles, such as shown at 61, which support film reels, such as shown at 62. The spindles 61 pass through the back casing wall, and have wheels, such as shown at 64, mounted thereon, (see Fig. 6). The wheels 64 have openings 65 in which the pins 12 and 13 will enter when there is relative motion between the discs 8 and 9 and wheels 64. In this manner, the connection between the drive disc 8 and the take-up reel, and the connection between the supply reel and disc 9, are made.

The magazine 60 is attached to a recorder 70 by any standard means, such as by a threaded pin 71, the casing 5 being connected to the recorder by screws passing through holes 6, as mentioned above. The sprocket wheel 26 is driven by a motor 72 through a flexible coupling 73, a gear reduction mechanism 74, a gear 75, and a gear 76 with which gear 75 meshes, and which drives a sprocket wheel 77, connected by chain 79 to the sprocket wheel 26. The film advancing mechanism, not shown, may be of any standard commercial type and driven by the motor 72.

Thus, the casing 5 with its clutch mechanisms may remain, if desired, attached to the recorder 70 at all times, the sprocket 26 being connected to the film driving mechanism through the chain 79. The reels within the magazine are then automatically connected to the clutches through the pins 8 and 9 and wheels 64, whenever a newly loaded magazine is attached to the recorder.

The proper amount of driving torque and holdback torque is provided by adjustment of the clutch mechanisms, as explained above.

I claim:

1. An attachment for a motion picture apparatus comprising a casing, film drive and driven shafts extending across said casing and projecting therefrom, a driven gear connected by a slip clutch to the drive shaft, a slack takeup brake associated with the driven shaft, and a disk mounted exteriorly of the casing on the projecting end of each of said shafts for engaging the takeup and supply reels, respectively, of a film magazine, the driven shaft being driven by said film.

2. An attachment according to claim 1, in which the driven gear and slack takeup brake are mounted within the casing.

3. An attachment according to claim 1, in which the disks are provided with spring actuated depressible pins for engaging holes in film reels.

MILFORD E. COLLINS.

REFERENCES CITED

The following references are of record in the file of this patent:

UNITED STATES PATENTS

| Number | Name | Date |
|---|---|---|
| 1,234,545 | Jenkins | July 24, 1917 |
| 1,372,675 | Davis | Mar. 29, 1921 |
| 2,000,436 | Berggren | May 7, 1935 |
| 2,184,331 | Becker et al. | Dec. 26, 1939 |
| 2,224,899 | Collins | Dec. 17, 1940 |
| 2,325,885 | Serrurier | Aug. 3, 1943 |

FOREIGN PATENTS

| Number | Country | Date |
|---|---|---|
| 258,264 | Great Britain | Mar. 8, 1928 |